United States Patent [19]

Hampel

[11] Patent Number: 4,851,183

[45] Date of Patent: Jul. 25, 1989

[54] UNDERGROUND NUCLEAR POWER STATION USING SELF-REGULATING HEAT-PIPE CONTROLLED REACTORS

[75] Inventor: Viktor E. Hampel, Pleasanton, Calif.

[73] Assignee: The United States of America as represented by the United States Department of Energy, Washington, D.C.

[21] Appl. No.: 194,772

[22] Filed: May 17, 1988

[51] Int. Cl.$^4$ .............................................. G21C 13/10
[52] U.S. Cl. .................................... 376/274; 376/367; 376/911
[58] Field of Search ................ 376/272, 273, 274, 275, 376/276, 367, 911, 914

[56] References Cited

U.S. PATENT DOCUMENTS

| | | | |
|---|---|---|---|
| T. 101,204 | 11/1981 | Hampel | 376/367 |
| 3,170,842 | 2/1965 | Kehler | 376/275 |
| 3,280,923 | 10/1966 | Muench | 376/273 |
| 3,815,619 | 6/1974 | Ross et al. | 251/68 |
| 3,941,187 | 3/1976 | Jabsen et al. | 376/911 |
| 4,000,038 | 12/1976 | Moser | 376/273 |
| 4,151,689 | 5/1979 | Schabert | 376/273 |
| 4,167,087 | 9/1979 | Schabert et al. | 376/273 |
| 4,244,153 | 1/1981 | Schwarzer et al. | 376/273 |
| 4,277,309 | 7/1981 | Schabert | 376/273 |
| 4,297,167 | 10/1981 | Schabert | 376/273 |
| 4,483,790 | 11/1984 | Gaiser | 376/273 |
| 4,759,901 | 7/1988 | Wachholz et al. | 376/367 |

OTHER PUBLICATIONS

S. N. Tower, "Deep Underground Reactor Concept," Trans. Am. Nucl. Soc., 41:6 (1984), 62-64.
P. M. Holl and V. Kopytoff, Design of a 36-Inch Miter Valve, UCRL-50863, Law. Liv. Na. Lab., U. of CA, Apr. 28, 1970.
Kammer et al., "Underground Nuclear Power Plants with Surface Turbine Generators," Nucl. Engin. and Des. 33 (1975), 308-335.
Lyczkowski et al., "Safety Consideration and Economic Advantage of a New Underground Nuclear Power Plant Design," Nucl. Engin. & Des. 53 (1979), 257-261.
Bowman et al., "A Concept of Underground Nuclear Power Plant Siting for Retaining Post Accident Atmosphere," Symposium on Underground Siting of Nuclear Power Plants, Mar. 16-20, 1981, Hannover, Fed. Rep. of Ger., & UCRL-84191, La. Liv. Na. Lab, U. of CA, Feb. 1981.

Primary Examiner—Deborah L. Kyle
Assistant Examiner—Richard W. Wendtland
Attorney, Agent, or Firm—Michael Lee; L. E. Carnahan; Judson R. Hightower

[57] ABSTRACT

A nuclear reactor for generating electricity is disposed underground at the bottom of a vertical hole that can be drilled using conventional drilling technology. The primary coolant of the reactor core is the working fluid in a plurality of thermodynamically coupled heat pipes emplaced in the hole between the heat source at the bottom of the hole and heat exchange means near the surface of the earth. Additionally, the primary coolant (consisting of the working fluid in the heat pipes in the reactor core) moderates neutrons and regulates their reactivity, thus keeping the power of the reactor substantially constant. At the end of its useful life, the reactor core may be abandoned in place. Isolation from the atmosphere in case of accident or for abandonment is provided by the operation of explosive closures and mechanical valves emplaced along the hole. This invention combines technology developed and tested for small, highly efficient, space-based nuclear electric power plants with the technology of fast-acting closure mechanisms developed and used for underground testing of nuclear weapons. This invention provides a nuclear power installation which is safe from the worst conceivable reactor accident, namely, the explosion of a nuclear weapon near the ground surface of a nuclear power reactor.

13 Claims, 6 Drawing Sheets

UNDERGROUND NUCLEAR POWER STATION USING SELF-REGULATING HEAT-PIPE CONTROLLED REACTORS

BACKGROUND OF THE INVENTION

The U.S. Government has rights in this invention pursuant to Contract No. W-7405-ENG-48 between the U.S. Department of Energy and the University of California, for the operation of Lawrence Livermore National Laboratory.

The present invention relates to nuclear power installations providing substantially enhanced environmental safety and operational security by emplacing the reactor core deep underground. This invention combines in a new application technology developed and tested for small, highly efficient, space-based nuclear electric power plants with the technology of fast-acting closure mechanisms developed and used to prevent discharge of radioactive materials from underground testing of nuclear weapons.

In the present era of dwindling petroleum resources and the urgent environmental threat posed by acid rain (attributed in large measure to coal-fired power plants), it is crucial to reestablish nuclear energy for industrial and consumer applications in the United States. The utilization of nuclear energy has been severely hindered largely because of concern for public health and safety in the event of a reactor malfunction or sabotage, or the vulnerability of a power reactor as a target of opportunity in time of war. A further concern, especially in the case of breeder reactors, has been the potential diversion of plutonium-containing fuel elements for clandestine use in nuclear weapons. A still further concern has been the danger to the populace posed by abandoned, decommissioned reactor structures dotting the countryside and remaining highly radioactive for centuries. These concerns have been substantiated by the Three Mile Island reactor meltdown in the United States and the explosive destruction of the Chernobyl graphite reactor in the Soviet Union.

Partly as a result of these concerns, the United States nuclear industry has come to a virtual halt, depriving not only the populace of the promise of plentiful energy for the foreseeable future, but also adversely affecting the energy-intensive heavy industries in the United States. Meanwhile, foreign countries, notably France, but also England, Canada, Japan, West Germany, and the Soviet Union, have forged ahead with their own programs to develop commercial nuclear power. These foreign countries have explored promising new reactor technologies that leave U.S. efforts far behind, and have reached the point where they are competing successfully against the United States in foreign marketing of nuclear power reactors.

The present invention holds promise of restoring the preeminent position once held by U.S. industry by providing for the first time nuclear power safe from the most improbable and destructive failure accident, calamity of war, or terrorist attack. Costly, above-ground accident containment and pressure vessels are substantially eliminated. Indeed, recognizing the relatively minor cost of the nuclear fuel in today's multi-billion dollar nuclear reactor designs, the present invention is expected to promote the use of inexpensive, throwaway nuclear reactor cores thermodynamically coupled efficiently and safely to above-ground conventional heat exchangers and power generating equipment. Moreover, the use of proven fast-closure technology assures that in case of any reactor malfunction, the radionuclides from the reactor core will remain safely contained underground. Moreover, the present invention, by having a reactor core which remains deeply buried after decommissioning, solves both the problem of public safety and the problem of diversion of materials. Moreover, the use of proven fast-closure technology assures that in case of any reactor malfunction, the radionuclides from the reactor core will remain safely contained underground. Finally, this invention provides a nuclear power installation which is safe from the worst conceivable reactor accident; namely, the scattering of long-lived radionuclides from the reactor core by the explosion of an atomic weapon.

PRIOR ART

The potential danger to the environment posed by both conventional nuclear power plants and conventional fuel-burning power plants has been widely recognized. The use of geothermal energy has been suggested as a partial solution to this problem, although the places where it can be used are very limited and only modest levels of power generation can be expected from installations of this kind. Wolf (U.S. Pat. No. 3,911,683, Oct. 14, 1975) describes a geothermal installation wherein a passive heat pipe extending into a well conveys heat from hot strata near the bottom of the well to heat conversion means near the top of the well. Lockett and Thurston (U.S. Pat. No. 4,644,750, Feb. 24, 1987) describe a similar installation utilizing an improved heat pipe comprising two concentric tubes.

Although geothermal energy may be virtually inexhaustible and, in principle, non-polluting, it is not without limitations. The conversion of geothermal energy to electricity is intrinsically limited in efficiency because of the relatively low temperature of the geological strata serving as the source of heat, and because there are relatively few geographical locations where strata of sufficiently high temperature may be reached by drilling at reasonable cost.

On the other hand, the disposal of nuclear reactors for power generation at the bottom of boreholes offers the benefits of high-temperature heat sources and flexibility in geographical siting combined with the enhanced security and environmental safety of sealable, below-ground operation.

Largely due to the experience gained in the underground testing of nuclear weapons, a mature technology has evolved, both for drilling large-diameter holes (routinely up to 12 feet in diameter) deeply into hard rock, and also for quickly and securely closing diagnostic pipelines against high-pressure gas and fast-moving debris emanating from the weapon after the explosion and before the gas and debris reach the ground surface and the atmosphere.

Tower (S.N. Tower, "Deep Underground Reactor Concept," *Trans. Am. Nucl. Soc.* 41:6 (1984) 62–64) has noted that the capability exists today for drilling a 6-meter-diameter, 600 meter deep shaft through hard rock in reasonable time and at reasonable cost. In similar vein, Behne (private communication, Lawrence Livermore National Laboratory, 1986) has cited figures indicating that 1986 drilling costs at the Nevada Test Site for nuclear weapons are a small fraction of the total cost of constructing a nuclear power station. For each foot of depth, an eight-foot-diameter hole costs roughly $700 to drill, and the corresponding figure for a ten-foot-diameter hole is $1800. Twelve-foot-diameter holes have also been drilled routinely.

Gas-driven fast-acting valve gates developed in the underground testing program can seal off a pipe within a few tens of milliseconds with high reliability, functioning while buried at a safe distance below the earth's surface. For example, Holl and Kopytoff (P. M. Holl and V. Kopytoff, *Design of a 36-inch Miter Valve*, UCRL-50863, Lawrence Livermore National Laboratory, University of California, Apr. 28, 1970) describe a valve having two gas-driven doors that shut against the mitered end of a 36-inch-diameter pipe. The doors move from fully open to fully closed positions in 35 milliseconds and are designed to seal against a pressure differential of 1600 psi. The valve is actuated remotely, and functions while carrying an axial load of 400,000 lbs.

Similarly, Curry and Gulick (G. G. Curry and C. W. Gulick, *Closure Mechanisms*, SLA-73-0668, Sandia Laboratories, Albuquerque, NM, October 1973) describe two gas-activated closures for a 60-inch-diameter pipe. The so-called "sixty-inch auxiliary closure" drives a pair of aluminum gates across the pipe in 16 milliseconds after a high-explosive cutting charge releases pressurized gas from a reservoir. The "sixty-inch fast gate" uses pressurized helium to drive a pair of inch-thick titanium slides across the pipe within 40 milliseconds after the firing of restraining explosive bolts. Procurement cost in 1973 for the first of these was 160,000 dollars and for the second was 235,000 dollars.

The same authors also describe a mechanically operated "clamshell" shutter which uses the force of loaded helical springs to clamp steel shutters across a twenty-six-inch-diameter pipe. The shutters close within a few milliseconds of the firing of restraining explosive bolts. The latch mechanism of this closure holds internal pressures up to 1000 psi. The 1973 procurement cost of this closure was 40,000 dollars.

In addition, high-explosive annular collars surrounding a diagnostic pipe and its internal electric cables used during an underground nuclear weapons test are utilized to close off such a pipe in less than a millisecond. Curry and Gulick describe the use of a tapered explosive collar to pinch off a 4-inch-diameter conduit within 200 microseconds. The collapsed section is nearly solid but not gas tight. The same authors also describe a "plug/collapse high explosive machine" which can symmetrically collapse a steel pipe eleven inches in inside diameter within 1 millisecond. The closed section is an almost solid cylinder of metal 50-55 inches long. The sections of pipe at each end of the collapsed section remain intact, and the closed section is the same diameter as the inside diameter of the open pipe. The 1973 procurement cost of this type of closure was 22,000 dollars.

During underground nuclear weapon testing, both types of closures are used in series. First, the high-explosive, fast-acting collar closure pinches the diagnostic pipes and control cables. Second, the mechanical, gas-activated valves seal the underground nuclear explosion from leaking of radioactive substances to the atmosphere. This technology has been used and perfected for underground nuclear weapon testing during the past 17 years and is described in the open literature.

There exist numerous descriptions in professional journals of concepts for the underground siting of nuclear power plants. Typically, a light-water reactor in a conventional, costly containment vessel is emplaced in an excavated cavity beneath the surface of the earth. This cavity may be created by boring a large-diameter shaft through hard rock (Tower, op. cit.) or, for shallower burial, by open-pit excavation (B. R. Bowman, H. E. Watling, and E. W. McCauley, "A Concept of Underground Nuclear Power Plant Siting for Retaining Post Accident Atmospheres," *Symposium on Underground Siting of Nuclear Power Plants*, Mar. 16–20, 1981, Hannover, Federal Republic of Germany, and UCRL-84191, Lawrence Livermore National Laboratory, University of California, February 1981). In concepts proposed by Yokoyama and Ichiki (K. Yokoyama, "Layout Study of PWR Underground Nuclear Power Plant," *Underground Siting of Nuclear Power Plants*, Proceedings of the International Symposium, Hannover, Bundesanstalt fuer Geowissenschaften und Rohstoffe, Mar. 16–20, 1981, F. Bender, editor, published by E. Schweizerbart'sche Verlagsbuchhandlung, Stuttgart, 1982, page 83, and T. Ichiki and Y. Muramatsu, "Layout Study of Underground Nuclear Power Plant (BWR)," op. cit., page 89), the nuclear power station is installed in multiple, interconnected tunnels in a steep coastal hillside.

In general, the proposed plants have riser and downcomer pipes transporting, respectively, pressurized steam and condensate to and from a heat exchanger situated at or near the surface of the earth. The control system for the reactor core includes conventional, electromechanically operated control rods, and there are additional shafts and excavated cavities to serve as access routes for maintenance workers, to house ancillary equipment, and to serve as pressure-relief volumes in case of reactor malfunction.

Various authors have proposed refinements to this basic scheme. Tower (op. cit.) adds an extremely reliable high-head "passive" safety injection system formed by a large surface water tank connected by pipe and check valves to the reactor vessel but does not solve the problem of disposal of the radioactive water slurry after it has contacted and cooled a malfunctioned nuclear reactor core. Kammer (W. A. Kammer and M. B. Watson, "Underground Nuclear Power Plants with Surface Turbine Generators," *Nuclear Engineering and Design* 33 (1975) 308) proposes a total of four underground chambers to house the reactor and supporting equipment. To avoid introducing leakage paths, access and ventilation shafts and tunnels in Kammer's design do not open directly into the reactor gallery. Instead, access is through one of the underground galleries for support equipment, providing for costly, redundant, internal, leak-tight doors between the enormous reactor gallery and the outside. Lyczkowski (R. W. Lyczkowski and J. T. Ching, "Safety Consideration and Economic Advantage of a new Underground Nuclear Power Plant Design, "*Nuclear Engineering and Design*" 53 (1979) 257) situates the entire power plant, including the cooling system, below ground level. A light water reactor, in its containment, is surrounded by a room of borated water to act as a cooling medium and neutron moderator in case of vessel rupture. Lyczkowski proposes a number of additional redundant safety features. These include a passive jet sprayer to cool the reactor pressure vessel and a passive cooling layer of fluidizing bed material lying above the jet sprayer to cool any air or steam-water mixture escaping from the jet sprayer. Additionally, excessive pressure in the fluidized bed region activates a series of gravitational hydraulic valves, releasing water from a suppression pool to fall onto the fluidized bed. Finally, the venting air or steam can be relief-vented into the plant's fluidized bed mixed-mode cooling system for long-period cooling. However, here, too, no provisions are indicated to safeguard against contamination of the above-ground environment or the water table.

Lyczkowski further proposes the use of fast gate closure mechanisms like those designed to rapidly obscure line-of-sight pipes in underground nuclear testing (see, for example, G. G. Curry and C. W. Gulick, *Closure Mechanisms*, SLA-73-0668, Sandia Laboratories, Albuquerque, NM, October 1973). The particular closure proposed for use is 1.5 m in diameter and is activated by high pressure helium gas to close within 40 ms. The purpose of this closure is to seal off the personnel-access shafts and corridors leading to conventional-design nuclear reactors in large underground cavities.

Bowman (B. R. Bowman, H. E. Watling, and E. W. McCauley, "A Concept of Underground Nuclear Power Plant Siting for Retaining Post Accident Atmospheres," *Symposium on Underground Siting of Nuclear Power Plants*, March 16–20, 1981, Hannover, Federal Republic of Germany, and UCRL-84191, Lawrence Livermore National Laboratory, University of California, February 1981) also proposed the use of fast closures as an additional safety feature. Bowman proposes a nuclear power station incorporating a water-cooled, gas-cooled, or fast breeder reactor buried under 90 meters of backfill. The turbine generators, condensers, preheaters, and feed pumps are located at or near the surface.

Oberth (R. C. Oberth, "Concept of Underground Siting of a CANDU Reactor in Deep Rock Caverns, "*Underground Siting of Nuclear Power Plants*, Proceedings of the International Symposium, Hannover, Bundesanstalt fuer Geowissenschaften und Rohstoffe, Mar. 16–20, 1981, F. Bender, editor, published by E. Schweizerbart'sche Verlagsbuchhandlung, Stuttgart, 1982, page 95) similarly proposes an underground reactor with the turbine-generator sets, condensers, and associated equipment located in a separate, shallow excavation. More specifically, this author proposes the siting of a CANDU reactor in deep rock. The four major caverns housing the reactor system are interconnected by tunnels and communicate with the surface through vertical access shafts. The author notes, without going into detail, that effective sealing is needed to close off the extensive network of underground chambers and vertical shafts in case of a reactor accident.

Bowman (op. cit.) devotes considerable space to a discussion of fast-acting seals to isolate contaminants from a malfunctioning reactor. He reports that experience with nuclear explosives shows that closure systems for all required penetrations of the reactor structure are entirely practicable. For example, an explosive closure can seal a 0.3 meter diameter evacuated pipe in less than one millisecond. A 64-mm-diameter valve using a gas generator to release a compressed spring can seal in less than 10 ms. A high-pressure gas-operated valve can close a 1.2-m-diameter orifice in approximately one second.

Containment requirements are based on a peak pressure in the nuclear system containment structure of 480 kPa. Fast-acting closures would be needed to seal air ventilation lines and piping for the transfer of steam to the turbines and for the return of condensate in these conventional reactor designs.

For sealing air ventilation lines, it is proposed to use gate valves or butterfly valves operated by gas pressure. Openings could be as large as one meter in diameter, and closure would be required to occur in less than 0.5 second. Steam lines and condensate return lines would also have to incorporate a fast acting closure system. The working temperature and pressure might be more than 20 MPa and 700 C.; line diameters could approach one meter. Closure times for this system, the authors note, should be as fast as those for the ventilation lines. An explosively operated valve placed before a slower gas operated or spring operated valve is proposed for use here.

The patent literature focuses on housings and structures for containing conventionally designed, relatively large-diameter nuclear reactors and their ancillary equipment, particularly the kind of structures that are buried at a shallow depth under layers of earth and the like (Schwarzer, *Earth Covered In-The-Ground Nuclear Reactor Facility*, U.S. Pat. No. 4,244,153, Jan. 13, 1981), or in enclosures hollowed out of rock (Moser, *Nuclear Power Station*, U.S. Pat. No. 4,000,038, Dec. 28, 1976). No limitations are placed on the type of reactor, although in some embodiments a pressurized water reactor is assumed. Similarly, some embodiments assume that the line for removing energy from the reactor is a pressurized steam line. It is assumed that the underground reactor cannot be operated without periodic maintenance, and that it must be accessible for servicing of equipment.

Schabert (Schabert, *Nuclear Reactor Installation*, U.S. Pat. No. 4,297,167, Oct. 27, 1981, and Schabert, *Nuclear Reactor Installation in Underground Construction*, U.S. Pat. No. 4,167,087, Sept. 11, 1979), for example, describes nuclear reactor installations consisting of one or more concrete shells buried beneath the earth of a hill. Closure means are included as essential parts of the inventions. Similarly, Moser (op. cit.) describes a nuclear power station emplaced in a multiplicity of underground rooms and corridors hollowed out of rock. Safety chambers are included, said chambers being secludable from the atmosphere.

In Schabert's 1981 patent, a multiplicity of concrete buildings are floatingly disposed to follow earth movements independent of one another. The line for removing energy from the reactor passes through an auxiliary shell, and valve means are disposed therein for closing of the energy removal line. Additional means for closing off the energy removal line may also be disposed in an annular space surrounding the reactor containment. Additionally, the energy removal line may extend through moveable sealed pipes to isolate the line per se from the pressure of the earth and from movements thereof, while providing access for inspection.

In Schabert's 1979 patent, a small auxiliary tunnel is provided in addition to the large main tunnel for transporting and assembling large components between the surface of the earth and the reactor. The main tunnel, which employs relatively slow sealing means, is closed off during normal operation of the reactor. This leaves only the rapidly sealable auxiliary tunnel open for access to the reactor during ordinary operation. The main tunnel is closed off by two separate blocking members to provide redundancy and possibly to allow evacuation of a gaseously contaminated region between the blocking members. Another feature of Schabert's 1979 invention is a pipeline extending through the auxiliary tunnel (possibly a pressurized steam line for conducting energy out of the tunnel) and supported by a transverse wall in the auxiliary tunnel. Blocking means are provided in the auxiliary tunnel for blocking the remaining open cross section of the auxiliary tunnel at the transverse wall.

In a different approach, but which is also typical of the ideas appearing in the relevant technical literature, Schwarzer (op. cit.) describes a nuclear reactor facility buried under successive layers of clay, gravel, and earth, the permeabilities of said layers being so chosen as to provide effective isoation of contaminants even if the walls of the reactor building should crack during a malfunction.

Although various authors describe underground nuclear reactor installations, and some even suggest the use of the fast-closure technology developed in support of the underground testing of nuclear weapons, yet in all instances in the published literature the housings and structures described are for containing relatively large-diameter conventional nuclear reactors and their ancillary power conversion equipment. Moreover, in all the prior art conventional means are assumed for controlling the nuclear chain reaction and for removing energy from the reactor core and transporting it to conversion means for the production of useful energy. It is further assumed in the prior art that access routes to the reactor for machines or personnel must be provided in order to perform periodic maintenance and inspection.

Although others have proposed basing nuclear power reactors underground, and have even proposed the application thereto of fast-closure mechanisms adapted from those developed in support of underground testing of nuclear weapons, nevertheless, no practical application has hitherto been made of these ideas. This may be because of the extra expense of emplacing conventional reactors underground, or the extra expense of re-engineering the parts of conventional reactors to adapt them for underground installation. The lack of practical application may also be because the conventional reactor technology that has heretofore been envisioned is inappropriate for underground installation. Specifically, the cores of large, conventional reactors are prone to meltdown in the case of a loss of coolant, and the operational difficulties of controlling a meltdown are aggravated if the reactor is emplaced underground. A further possible reason for the absence, heretofore, of actual underground reactor emplacements, is that with conventional heat-transfer technology it is impracticable to transfer heat from a reactor core buried at an effectively safe depth to a heat exchanger at or near the surface of the earth. A further possible reason is that containment vessels and systems have not heretofore been eliminated or reduced in scope and cost.

All of these problems are overcome in the present invention. The present invention does not employ conventional nuclear reactor power station technology. Rather, it utilizes a special class of underground nuclear reactors whose designs are closely related to their mode of emplacement. More specifically, the present invention is drawn to a relatively small-diameter, self-regulating reactor which can be emplaced within a relatively narrow, straight-sided borehole without an expanded chamber at the bottom. Moreover, the reactor of the present invention is operable for extended periods of time without maintenance and without access by ancillary equipment. Even more specifically, the nuclear reactor forming part of this invention is a compact, reflector-critical, fast-neutron-spectrum nuclear reactor using highly enriched uranium and/or plutonium with heat pipes for energy recovery from, and neutronic control of, the reactor. Latent heat of condensation is conducted very rapidly in heat pipes by evaporated gas at near sonic velocity. This very great rate of heat transfer makes it possible to transport useful energy with acceptably small loss from the reactor core buried at a safe depth below ground to energy conversion means at or near the earth's surface. Specialized nuclear reactors of this kind have been intensively studied for possible applications in orbiting or space-based systems and their construction and use are well-known in the art. The theory of heat-pipe controlled compact, fast nuclear reactors is described, for example, in V. E. Hampel and R. P. Koopman, *Reactivity Self-Control on Power and Temperature in Reactors Cooled by Heatpipes*, UCRL-71198, Lawrence Radiation Laboratory, University of California, Nov. 1, 1968.

OBJECTS OF THE INVENTION

In the present invention, the line which removes energy from the reactor is a heat pipe assembly, part of which also comprises part of the nuclear-criticality-determining means within the reactor core. Thus the present invention describes a nuclear power plant with the new and unique feature that the lines for removing energy from the core as well as the lines for exerting remote control over the operation of the reactor are redundantly sealable, of near-constant relatively small diameter, and substantially unbounded in linear extent. Thus one object of the invention is to provide a significant enhancement in the ability to seal off nuclear contaminants from the environment in case of accidental failure, sabotage, or acts of war.

The reactor core of the present invention is compact and of relatively small diameter. It is thus adaptable for emplacement in a straight-sided borehole of the kind that can be made using conventional drilling equipment. Moreover, the use of heat pipes for removal of thermal energy from the reactor core of the present invention makes it possible to emplace the reactor core at depths of 1000 feet or more and still remove useful energy to the surface of the earth with acceptably small loss. Accordingly, it is an object of this invention to provide a low-cost reactor that can economically be emplaced at an effectively safe distance underground.

A further object of the invention is to provide, for the first time, a low-cost, throw-away nuclear reactor, in a low-cost pressure vessel, that can be safely abandoned in place at the end of its operative lifetime without damage or threat of damage to the environment, and such abandonment can take place with equal assurance of safety regardless of whether the reactor has shut down because of a malfunction or because it has reached the end of its planned lifetime.

Additional reactors can be arranged underground to supply heat to one or more heat exchangers situated at or near the surface of the earth. Thus a further object of the invention is to provide redundant heat sources for ongoing operation and over extended periods of time in combination with heat exchangers and turbines that are located where they can be easily maintained.

A further object of the invention is to provide enhanced longevity of the reactor core. In one possible embodiment of the invention, the reactor is operated as a nuclear breeder reactor, having intrinsically greater operational longevity per reactor core as compared with non-breeder reactors. Moreover, the pneumatic inert-gas buffered remote control system contributes to increased operational safety and longevity by allowing for differentiated heat removal as a function of core radius to flatten radial power profiles as a function of time. This is a requirement for long-life reactor operation with resultant changes in the radial power profile of the core.

Moreover, because the present invention achieves isolation of nuclear contaminants by deep burial of the reactor core in a vertical shaft, and because the heat-removing means comprise heat pipes that can be thermally coupled without intermixing the coolants of adjacent heat pipes and can be operated in series over a great linear distance, and because the heat exchangers and turbines are decoupled from the radioactive core and its primary coolant by multiple, independent heat-pipe stages and can be serviced at or near the surface of the earth with the same ease as those of coal or gas-fired power plants, the present invention therefore offers distinct advantages in diffusively and convectively isolating from the atmosphere such radioactive contaminants as might emerge from a malfunctioning reactor. Thus a further object of this invention is to provide safety and security even in the face of the worst conceivable threat: the nearby detonation of a nuclear weapon due to war or terrorist activity that might widely disperse the long-lived radioactive components of the reactor core.

A still further object of this invention is to provide a way to safely employ breeder reactor technology, and so enjoy all the innate advantages of that technology—developed by the U.S. Department of Energy and demonstrated, for example, by the National Power Industry France—and still avoid the risks, high cost, and concerns that attend above-ground operation of nuclear power plants today.

SUMMARY OF THE INVENTION

In accordance with an embodiment of the present invention, an underground self-regulating nuclear power station includes a compact, epithermal or fast-neutron-spectrum nuclear reactor using heat pipes, said reactor being disposed beneath the earth's surface at the bottom of a vertical bore hole. The invention also includes means for utilizing heat generated by the reactor, said means disposed at a safe distance from the reactor, and means for transferring heat from the reactor to the means for utilizing heat.

In a preferred embodiment of the invention, the means for transferring heat from the reactor comprise heat pipes. The means for utilizing heat may be located at or near the surface of the earth. The heat utilization means may comprise a power plant for the generation of electricity and/or suitable reservoirs drawn upon by industry and/or residences.

In a preferred embodiment of this invention, a primary array of heat pipes transfers heat from the reactor core to an array of secondary heat pipes. These, in turn, may drive a third-order heat pipe array, and so on, the series of thermally contacting heat pipes ultimately terminating at the means for utilizing heat, which may comprise a conventional thermionic, thermoelectric, Rankine cycle, or other state-of-the-art energy conversion system.

Passive control over the reactor is provided by selecting a working fluid within the primary and/or secondary heat pipe arrays having neutron reflective properties in the fast neutron spectrum. In a preferred embodiment of the invention, an inert gas pressurization system connected to the condensor regions of the primary, secondary, and/or higher-order heat pipe arrays provides active neutronic control of the system. The operational temperature is between 1400 and 2500 Kelvin degrees. This reactor system is inherently fail safe and does not require solid mechanical control components in the extreme environment within or proximate the high temperature core region of the nuclear reactor. This technology has been described by Hampel (V. Hampel, *Compact Fast Nuclear Reactor Using Heat Pipes*, U.S. Defensive Publication No. T101,204, Nov. 3, 1981) and is within the state of the art.

In the preferred embodiment, the condenser section of each heat pipe in the primary array is received coaxially within the evaporator section of a heat pipe in the secondary array, and so on through the ascending series of thermally connected heat pipe arrays. The evaporator sections of the heat pipes of the primary heat-pipe array are received within a matrix of solid fissile fuel to provide a reactor core. The fuel matrix in turn is surrounded by a neutron reflecting mantle. In the preferred embodiment, the neutron-reflecting mantle is composed of beryllium oxide and/or molybdenum. A layer of europium oxide is deposited on the interior surface of the neutron-reflecting mantle. The europium oxide layer absorbs epithermal neutrons reflected to the core from external media, thereby preventing any external contribution to criticality during transport or while at the bottom of the emplacement hole. The mantle in turn is received within a liquid-reflector reservoir for containing liquefied neutron-reflecting material. Directly beneath the liquid-reflector reservoir is disposed a storage reservoir for containing liquefiable neutron-reflecting material during emplacement, before start-up, and after reactor shut-down. The entire core assembly, comprising fuel matrix, mantle, liquid-reflector reservoir, and storage reservoir, is received within a pressure vessel made of a suitably heat-resistant material which preserves its structural properties at the operating temperature of the reactor core. The pressure inside the pressure vessel is relatively low since it is suitably chosen to balance the vapor pressure of the coolant liquid inside the primary heat-pipe array.

In the preferred embodiment of the invention, the primary and secondary heat pipes are conical in configuration. The conical primary and secondary heat pipes diverge in their evaporator sections to prevent the vapor velocity from reaching the sonic limit as the vapor streams from the apex toward the base. Furthermore, the fluid return passages of the heat pipe narrow as they approach the condensor apex of the cone. Internal semi-helical baffles deflect the evaporating gas as it condenses and drive the condensate towards the evaporator end of the heat pipes. This pumping action enhances the passive gravitational return of the heat-pipe fluid, reducing the likelihood of burnout over a range of power levels, and thus providing substantially fail-safe operation.

Passive nuclear control stability is provided by selecting primary and secondary working fluids having a negative void coefficient of reactivity; e.g., lithium-7 fluoride or beryllium difluoride. (The working fluids in the secondary array of heat pipes may be chosen to be the same as in the primary array to optimize heat transfer and material compatibility.) The mass of working fluid in the evaporator sections of the heat pipes varies inversely with the heat flux driving the heat pipes. As the power level of the reactor rises, the mass of working fluid in the evaporator section decreases. If the working fluid has a negative void coefficient of reactivity, it provides prompt, negative temperature and power coefficients of reactivity, thus decreasing the neutron flux and consequent power generation.

Active control of the reactor is provided, in a preferred embodiment of the invention, by means of a remote inert-gas pressurization system connected to the condenser sections of the primary, secondary, and higher heat-pipe arrays. By increasing and decreasing the volume of inert gas in the condenser volumes of the heat pipes, the mass of working fluid circulating in the primary heat pipes within the neutron reactive core volume can be increased and decreased, respectively. The inert gas within the condenser section also provides passive control properties.

The inert-gas pressurization control system also comprises means to scram or shut-down the system. Specifically, the inert gas pressurizing the condenser section of the heat pipes forming the secondary (or higher) array can suddenly be vented into a reservoir. This action increases the effective condenser area of the secondary (or higher) heat pipe array, and ultimately causes the condenser section of the primary heat pipe array to cool. This displaces a substantial fraction of the neutron reflective working fluid out of the core volume and into the condenser section of the primary heat pipe array, where it may eventually solidify as the reactor core cools down.

Even when the neutron-reflecting working fluid is substantially disposed within the core volume, the reactor cannot become critical until the liquefied neutron-reflecting material is transferred into the liquid-reflector reservoir. Thus cold startup of the reactor is achieved by electrically melting the neutron-reflecting material in the storage reservoir and transferring it under the pressure of an inert gas into the liquid-eflector reservoir. The combined neutron-reflecting properties of the mantle, the liquid reflector, and the neutron-reflecting working fluid are sufficient to attain nuclear criticality.

Transferral of the liquid reflector out of the liquid-reflector reservoir and into the storage reservoir under the pressure of an ideal gas provides additional means to exert coarse control over reactor criticality and to shut down the reactor.

As discussed above, the line which removes energy from the reactor in the preferred embodiment is a heat-pipe assembly, part of which also comprises part of the nuclear-criticality-determining means within the reactor core. Thus the present invention describes a nuclear power plant with the new and unique feature that the lines for removing energy from the core as well as the electronically controlled, pneumatic lines for exerting remote control over the operation of the reactor are redundantly sealable and relatively unbounded in linear extent, providing a significant enhancement in the ability to seal off nuclear contaminants from the environment.

The features of the present invention are set forth with particularity in the appended claims. The present invention, both as to its organization and manner of operation, may best be understood by making reference to the following description taken in conjunction with the accompanying drawings in which like reference characters refer to like elements.

BRIEF DESCRIPTION OF THE DRAWINGS

FIG. 2 is a cross-sectional side view of two heat-pipe controlled nuclear reactors, each of which is thermally coupled to cylindrical heat pipes extending above it.

FIG. 3 is a cross-sectional side view of heat pipes used in accordance with the invention.

FIG. 4 comprises schematic top and side views of an inert gas control system, in accordance with one embodiment of the invention.

DETAILED DESCRIPTION OF THE INVENTION

Figure 1:
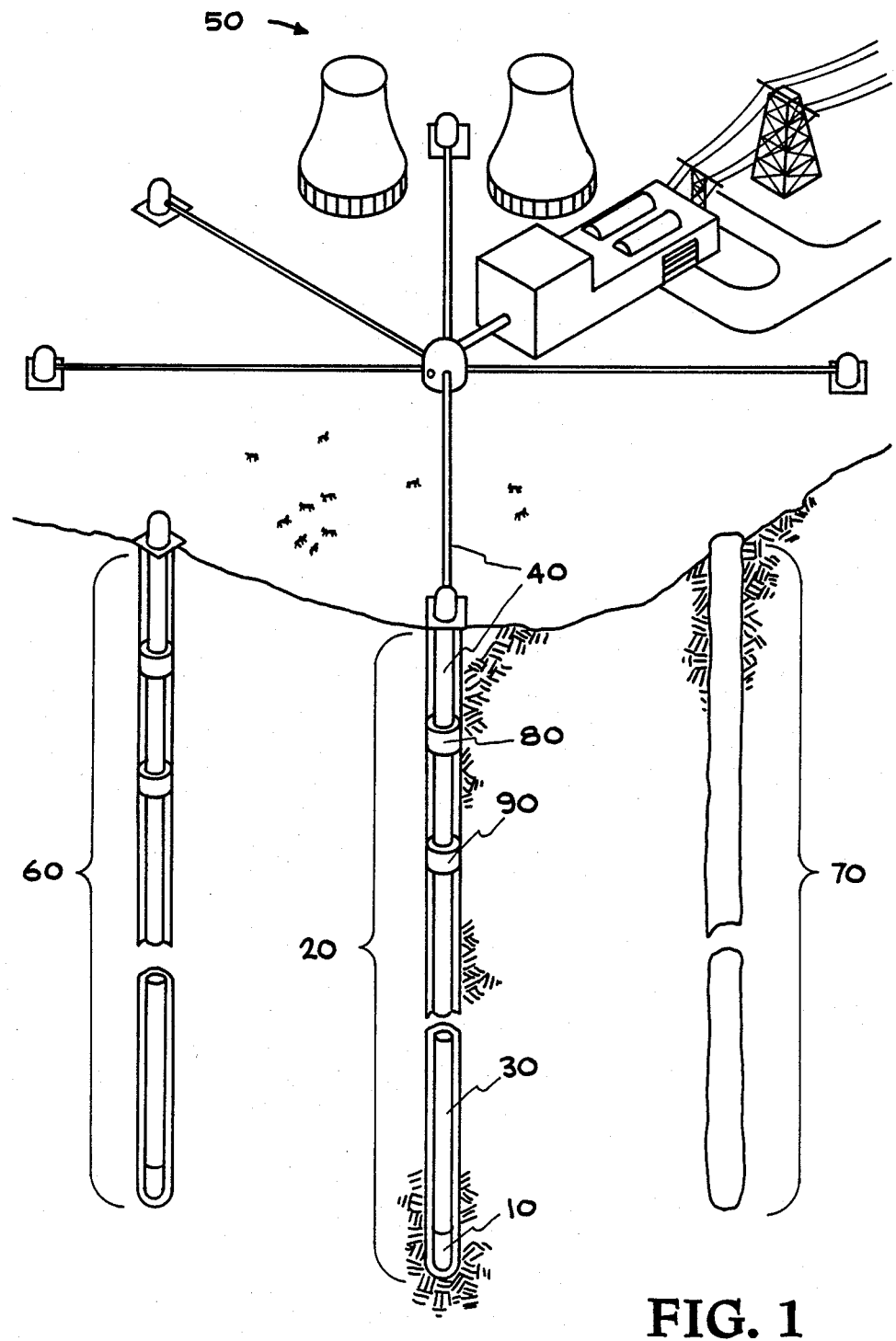
FIG. 1 is an aerial view of a multiple-reactor nuclear power generating facility, made in accordance with the invention. Also included in the figure is a cutaway side view of several active and inactive boreholes.

Referring now to FIG. 1, the reactor core is disposed within a comparatively low-cost pressure vessel (10) at the bottom of a vertical shaft (20). The shaft is of sufficient diameter to receive the horizontal cross section of the reactor pressure vessel and may possibly but not exclusively have a depth of 600–1500 feet. That depth which constitutes a safe distance for isolating nuclear contaminants from the atmosphere depends on details of the local lithology and stratigraphy. A possible depth cited in the technical literature for underground siting of a conventional nuclear power plant is 340 feet (Bowman, Watling, and McCauley, op. cit.). To be safe against the worst conceivable reactor accident, namely the nearby explosion of a nuclear weapon, the reactor must be situated at a depth of at least 800 feet.

The shaft (20) is lined with a borehole liner (30) of impermeable material which in a preferred embodiment of the invention comprises a concrete-encased, thermally insulated steel pipe.

Heat transfer means (40) remove heat from the reactor core and transport it to heat utilization means (50) located at or near the surface of the earth. The heat utilization means (50) may typically comprise a boiler, turbine generator, and cooling tower.

In one possible embodiment of the invention, as shown in FIG. 1, the means (50) for exchanging and utilizing heat from the reactor occupy a central generating facility on or near the surface of the earth, where they can readily be serviced like those of any conventional coal- or gas-fired power plant, and where they do not require any extra and costly pressure containment vessels and safety cooling system. The heat exchange and utilization means (50) at the surface of the earth are surrounded by a plurality of shafts (20), (60), (70). At any one time during the operative lifetime of the invention, one or more operative reactors at the bottoms of their respective shafts are thermally connected to the centrally located heat exchange and utilization means (50) by underground, vertical heat pipes which are thermally connected to the central heat exchange means (50). As an individual reactor completes its operative lifetime, it is cut off from the heat exchange means and sealed in situ within the lower portion of the casing by activating valves and underground mechanical closures (80) and possibly explosive closures (90). Thus the old reactor is abandoned in place in a deactivated hole (60). New reactors can be installed in previously unused shafts (70). Prior to becoming operative, new reactors are thermally connected to the central heat exchange means and electrically heated to liquefy the solidified working fluid and the liquefiable neutron-reflecting material.

Figure 2A:
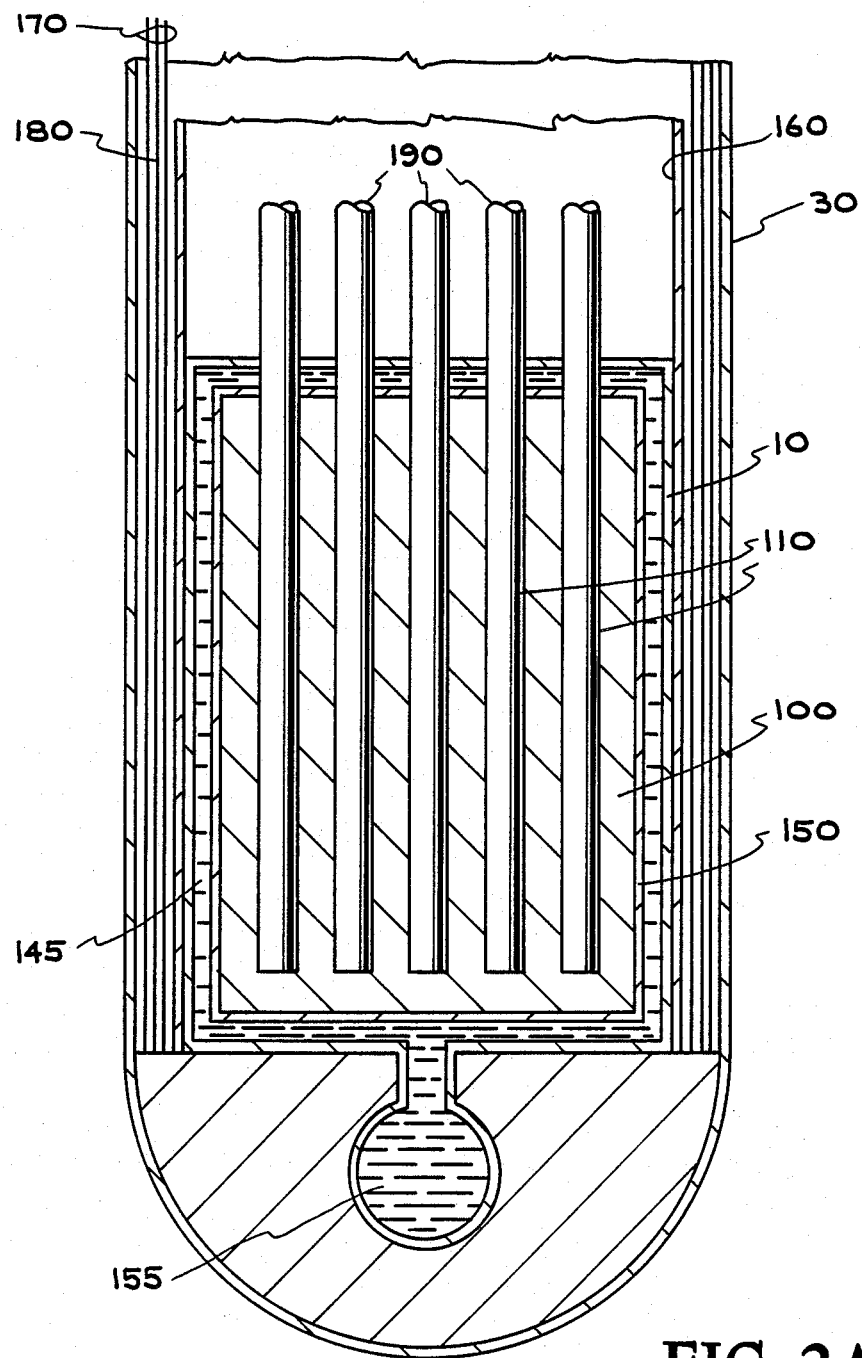
FIG. 2a shows a conical reactor with conical primary heat pipes, in accordance with a preferred embodiment of the invention.
Figure 2B:
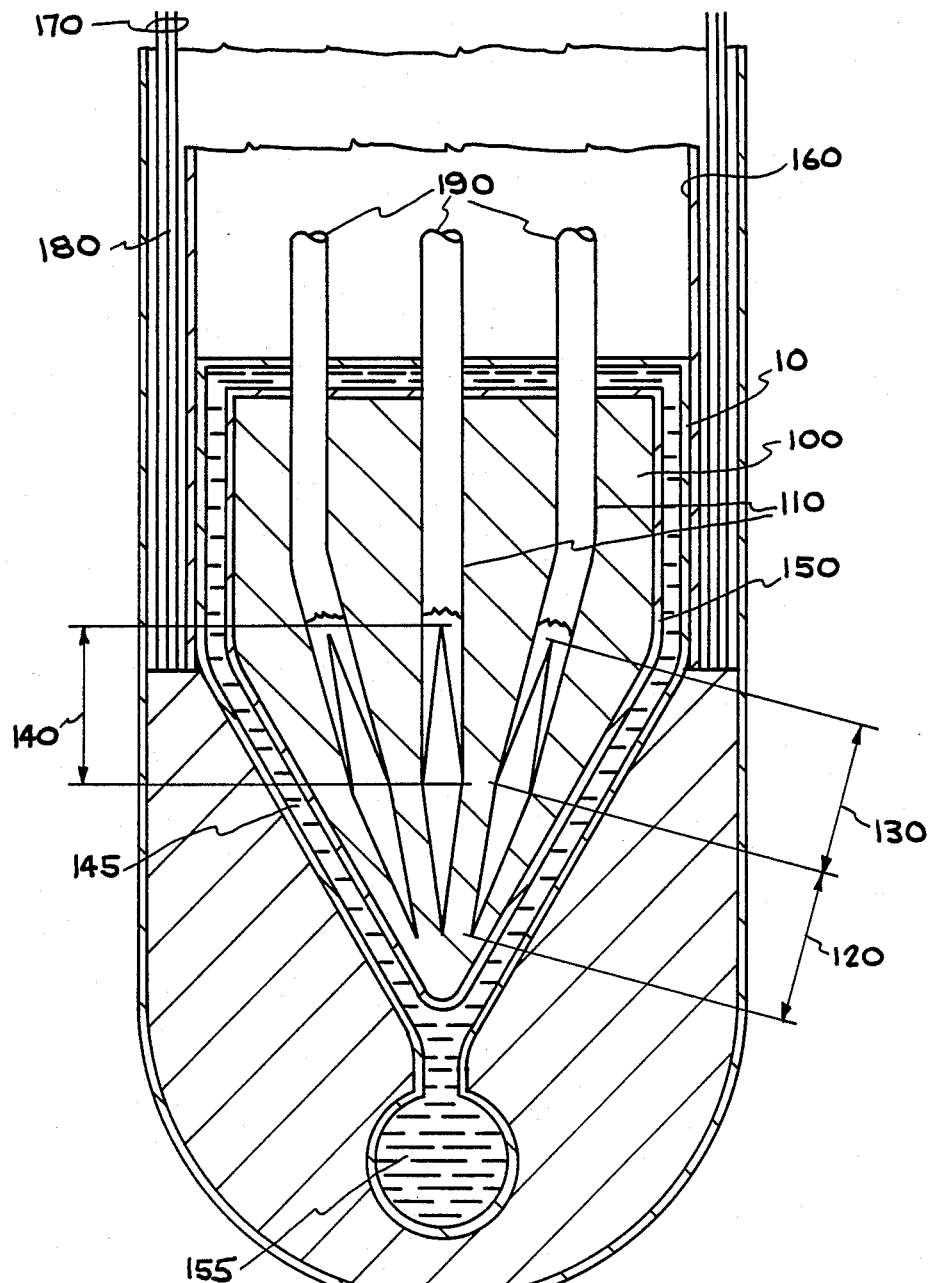
FIG. 2b shows a cylindrical reactor in accordance with an alternative embodiment of the invention.

Referring now to FIG. 2, the reactor is of the type known in the art as a "self-regulating, heat-pipe controlled, reflector-critical, compact, fast reactor." The reactor comprises a core (100) which in a preferred embodiment is conical, and nested, inert-gas buffered heat pipes (110). The heat pipes (110) are arranged preferably in primary, secondary, and higher-order arrays. The primary heat pipes, which extend into the core of the reactor and remove heat directly therefrom, are conical in the preferred embodiment of the invention. The evaporator sections (120) of the primary heat pipes are received within the reactor core (100). The condensor sections (130) of the primary heat pipes are received within the evaporator sections (140) of the secondary heat pipes. Similarly, the condensor sections of the secondary heatpipes may be received coaxially within the evaporator sections of the tertiary heat pipes, and so forth. The heat pipes emerging from the reactor core pass through a reflector region and extend vertically in the space above the reactor. The reflector region comprises a liquid-reflector reservoir (145) and a neutron-reflecting mantle (150). A liquefied neutron-reflecting material is transferred to the liquid-reflector reservoir from a storage reservoir (155). The design and use of a reactor of this kind is described in V. Hampel, U.S. Defensive Publication No. T101,204, "Compact Fast Nuclear Reactor Using Heat Pipes."

The pressure vessel (10) enclosing the core is composed of heat-resistant material chosen to maintain its structural strength at the operating temperature of the reactor core, which possibly but not exclusively may lie in the range between 1400 and 2500 Kelvin degrees. The operating pressure lies in the range of vapor pressures of suitable working fluids employed in heat pipes in the range of operating temperatures. A partial list of possible working fluids includes lithium fluoride, lithium, and beryllium difluoride. Over the temperature range from 1400 to 2500 Kelvin degrees, the vapor pressure of lithium fluoride ranges from 0.01 to 15 bars. Over the same temperature range, the vapor pressure of lithium ranges from 0.1 to 50 bars. Over the same temperature range, the vapor pressure of beryllium difluoride ranges from 1 to 10,000 bars.

The pressure vessel (10) is continuous with a casing (160) which extends vertically upward within the borehole liner between the reactor core and the surface of the earth.

The pressure vessel (10) is enclosed within and thermally insulated from the borehole liner (30). A thermally insulating layer (170) is disposed within the annular space (180) defined between the outer surface of the pressure vessel and the inner surface of the borehole liner. In a preferred embodiment of the invention, the insulating layer comprises multiple layers of reflective foil in an evacuated space. In an alternative embodiment, the annular space (180) may additionally contain a liquid coolant for circulation as a carrier of low-grade heat in a cogeneration loop.

The annular space (180) additionally contains temperature sensors and chemical sensors to assure that the contents of the pressure vessel and casing are thermally insulated from the ground and that there is no exchange of material between the pressure vessel or casing and the ground.

A series of at least two thermally connected heat pipe arrays (190) (i.e., the primary and secondary arrays) extends within the casing (160) from the reactor core to heat utilization means (50) situated at or near the surface of the earth. Additional stages of heat-pipe arrays may be interposed within the casing between the secondary heat-pipe array and the heat-exchange means. Each higher stage is added by coaxially receiving the condenser section of a lower-stage heat pipe within the evaporator section of the corresponding next-higher-stage heat pipe.

Figure 3A:
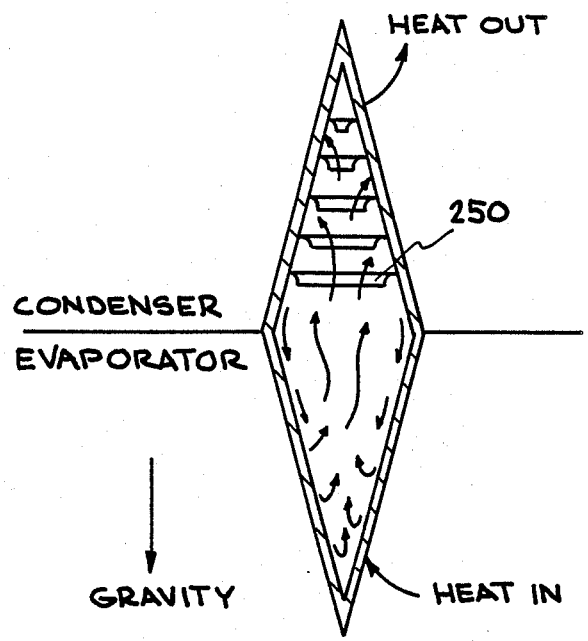
FIG. 3a is a cross-sectional side view of a conical heat pipe, showing the flow of heat during operation.
Figure 3B:
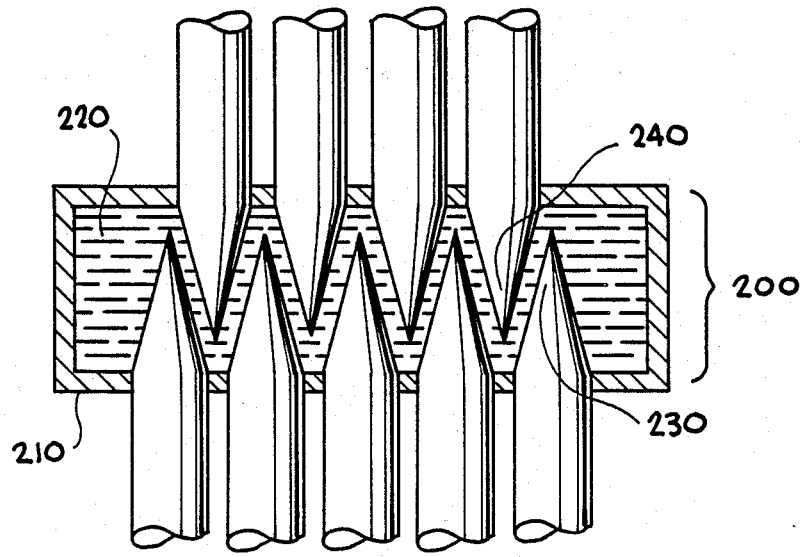
FIG. 3b is a cross-sectional side view of a thermal coupling manifold interpenetrated by the terminal ends of successive heat pipe stages and filled with a heat-transfer fluid.

Referring now to FIG. 3, heat may additionally be transferred between vertical heat-pipe stages by the use of a thermal coupling manifold (200). The manifold (200) is a thermally insulated enclosure (210) filled with a heat-conductive fluid (220). The condensor ends (230) of the lower-stage heat pipes enter from the bottom of the manifold and terminate within the heat-conductive fluid. The evaporator ends (240) of the higher-stage heat pipes terminate within the heat-conductive fluid and exit through the top of the manifold. This arrangement decouples every individual heat pipe of a higher-stage array from any specific heat pipe in the lower-stage array. This offers distinct advantages in the case of failure of a heat pipe. In that case, the remaining heat pipes share the load previously carried by the failed heat pipe.

In a preferred embodiment of the invention, semi-helical baffles (250) within the heat pipes deflect the evaporating gas as it condenses and drive the condensate towards the evaporator end of the heat pipes. This pumping action enhances the passive gravitational return of the heat-pipe fluid, reducing the likelihood of burnout over a range of power levels, and thus providing substantially fail-safe operation.

The condensor section of the highest-stage heat pipe array is thermally connected to the heat-utilization means.

Figure 4A:
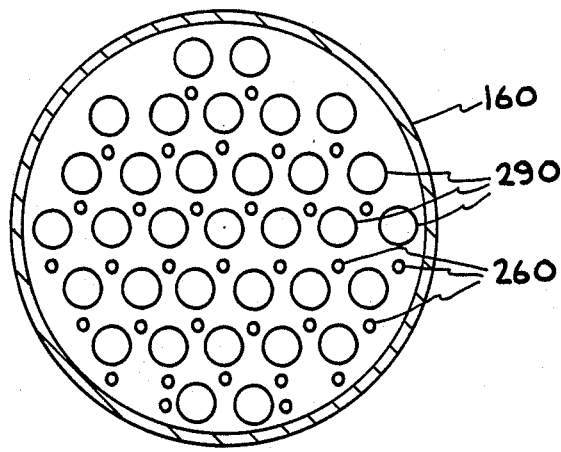
FIG. 4a is a top view of the matrix of heat pipes (large circles) extending vertically from the reactor core interspersed with the inert gas lines (small circles) of the inert gas control system.
Figure 4B:
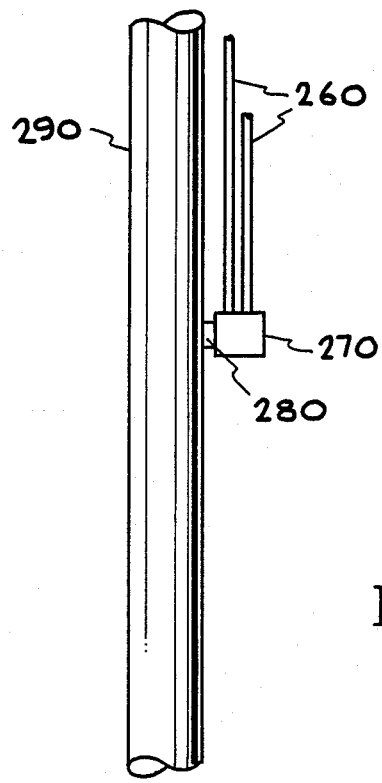
FIG. 4b is a side view of one heat pipe coupled to a high-pressure gas line and a low-pressure gas line through a three-way valve.

Referring now to FIG. 4, the heat pipes in one or more arrays may contain, in addition to the working fluid, quantities of inert buffer gas to enhance the operation of the passive self-controlling mechanism and to provide remote, fast-acting, active reactor power control. The action of the buffer gas which may enhance passive self-control is described by Hampel (U.S. Defensive Publication No. T101,204, "Compact Fast Nuclear Reactor Using Heat Pipes"), and has been used in radioisotope space-power heat sources to regulate the temperature of the thermionic diodes over time.

A preferred embodiment of the invention additionally incorporates active means, essentially as described by Hampel (U.S. Defensive Publication No. T101,204, "Compact Fast Nuclear Reactor Using Heat Pipes"), to control the reactivity of the reactor core by adjusting the pressure of buffer gas in one or more heat pipe arrays. Accordingly, a preferred embodiment of the invention additionally comprises high- and low-pressure gas lines (260) extending vertically within the casing (160) between the vertical heat pipes to means located at suitable depths below the surface of the earth for supplying, storing, and controlling the inert buffer gas. Each pair of high-pressure and low-pressure gas lines terminates at its lower end in a three-way valve (270) communicating with a gas-flow inlet (280) through the wall of a secondary or higher-stage heat pipe (290) near the condensor section of said heat pipe. The setting of the valve can be electro-pneumatically adjusted to either open the inlet from the high-pressure gas line to the heat pipe, effectively raising the operating temperature of the heat pipe, or to open the low-pressure inlet, permitting the venting of buffer gas and effectively lowering the operating temperature, or to close off both gas lines from the heat pipe.

Sensors within the pressure vessel, casing, annular space, heat pipes, and manifold transmit information about temperature, pressure, chemical composition, and other operating parameters to a control center at or near the surface of the earth.

Figure 5:
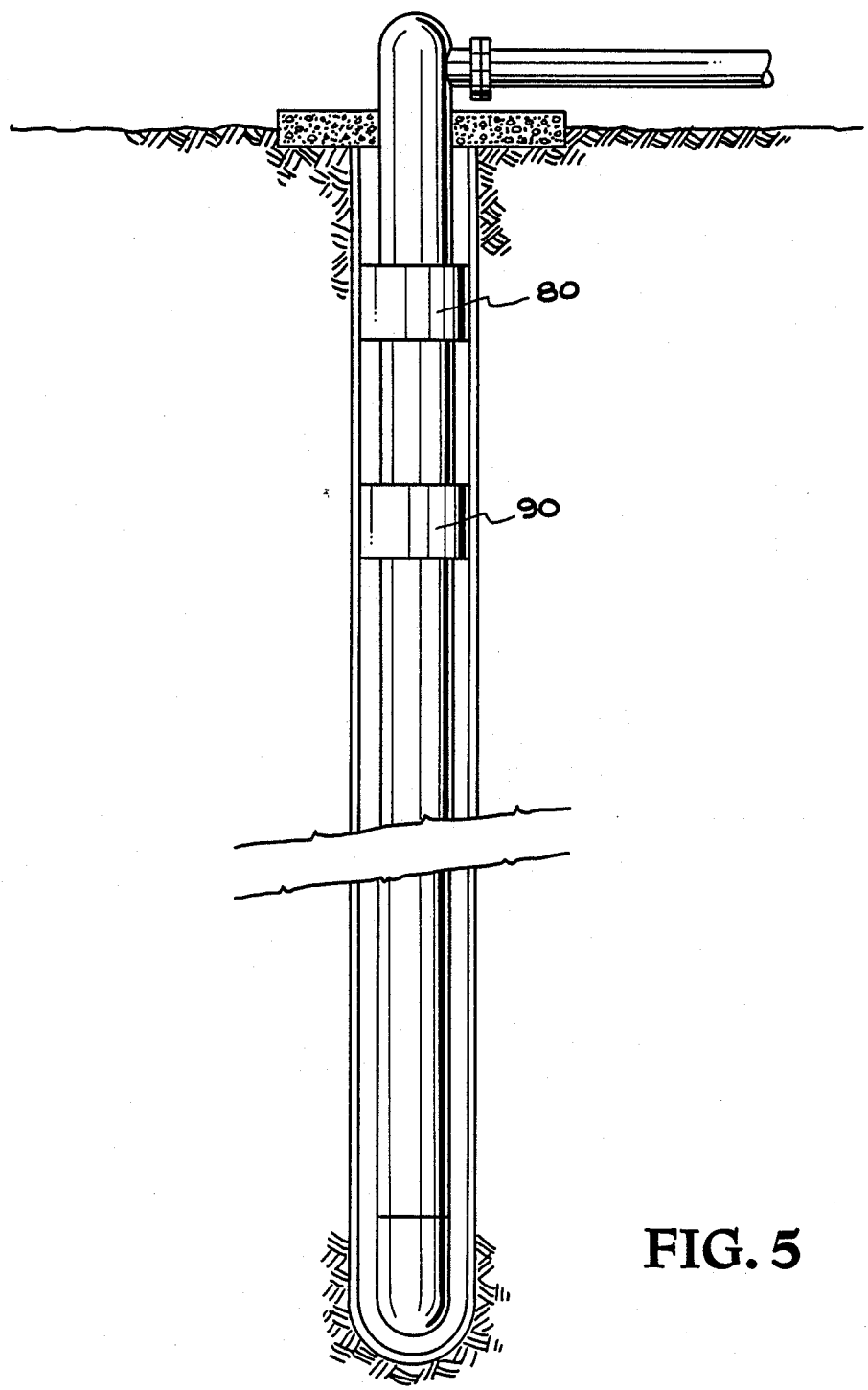
FIG. 5 is a cross-sectional side view of the underground portion of one active borehole of the invention of FIG. 1, including an upper mechanical closure mechanism and a lower explosive-driven closure mechanism.

Referring now to FIG. 5, at various depths along the shaft there are disposed closure means (90) and (80) to sealingly close off the casing and all heat pipes and electro-pneumatic control lines and sensors contained therein. The positions of the closure means are chosen to be optimally effective in isolating from the atmosphere such gaseous and particulate contaminants as might issue from the reactor system in the case of malfunction, and as might be expected to issue during the cooling-off period of a reactor that has been permanently shut down.

In a preferred embodiment of the invention, the closure means include first-acting high-explosive-actuated pipe closures (90), and later-acting mechanically or pneumatically driven butterfly valves, sliding gates, and/or miter valves (80). The mechanically or pneumatically driven closure means (80) are disposed between the explosive closures (90) and the surface of the earth.

The foregoing description has been presented for purposes of illustration and description. It is not intended to be exhaustive or to limit the invention to the precise forms disclosed, and obviously many modifications and variations are possible in light of the above teaching. For example, the reactor may employ a cylindrical core and cylindrical heat pipes in place of the conical elements described herein. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A nuclear power generating facility, comprising:
a substantially vertical borehole in the surface of the earth which is at least 600 feet deep and has a substantially constant diameter;
a casing, extending from the surface of the earth down to at least 600 feet deep, lining the borehole and wherein the casing is completely within the borehole;
a self regulating nuclear reactor, of a diameter less than the diameter of the borehole, within the casing at least 600 feet below the surface of the earth, wherein the reactor generates heat;
means for converting the heat generated by the reactor to electricity, wherein the conversion means is located at or above the surface of the earth;
means for transferring the heat generated by the reactor from the reactor to the conversion means; and
a means for completely and permanently closing all access between the surface of the earth and the reactor through the borehole, wherein said means is located between the reactor and the surface of the earth, and wherein the casing and the borehole have no opening below the closing means sealing the reactor within the casing.

2. A nuclear power generating facility, as cited in claim 1, wherein the means for completely and permanently closing access is able to completely close access in less than 0.5 seconds after actuation to prevent the accidental upward movement of radioactive materials within the casing after actuation.

3. A nuclear power generating facility, as cited in claim 2, wherein the means for completely and permanently closing access comprises gas driven doors which move from a fully open to fully closed positions in less than or equal to substantially 40 milliseconds against a pressure differential as high as substantially 1600 psi to prevent the accidental upward movement of radioactive materials within the casing after actuation.

4. A nuclear power generating facility, as cited in claim 2, wherein the means for completely and permanently closing access, comprises:
a first acting, high explosive actuated pipe closure; and
a plurality of later acting mechanical valves located between the first acting closure and the surface of the earth.

5. A nuclear power generating facility, as cited in claim 1, wherein the means for transferring the heat comprises a heat pipe array.

6. A nuclear power generating facility, as cited in claim 5, wherein the heat pipe array comprises a plurality of thermally coupled heat pipe stages.

7. A nuclear power generating facility, as cited in claim 5, wherein the heat pipe array comprises a first heat exchanger, and a first plurality of heat pipes, which have first ends which are located in the reactor and which have second ends which are located in the first heat exchanger.

8. A nuclear power generating facility, as cited in claim 7, wherein the first ends of the first plurality of heat pipes are conical with the apex of each cone located on the part of the first ends furthest from the second ends, and wherein the second ends of the first plurality of heat pipes are conical with the apex of each cone located on the part of the second ends furthest from the first ends, and wherein the second ends comprise semi-helical baffles.

9. A nuclear power generating facility, as cited in claim 8, wherein the heat pipe array further comprises, a second heat exchanger and a second plurality of heat pipes, which have first ends which are located in the first heat exchanger and second ends located in the second heat exchanger.

10. A nuclear power generating facility, as cited in claim 7, wherein the self regulating nuclear reactor is a self regulating heat pipe controlled nuclear reactor.

11. A nuclear power generating facility, as cited in claim 10, wherein the self regulating nuclear reactor is a self regulating heat pipe controlled, reflector critical nuclear reactor.

12. A nuclear power generating facility, as cited in claim 1, wherein the self regulating nuclear reactor is a fast breeder reactor.

13. A nuclear power generating facility, as cited in claim 1, wherein the diameter of the borehole is less than 6 meters.

* * * * *